United States Patent [19]

Abe

[11] Patent Number: 5,488,492
[45] Date of Patent: Jan. 30, 1996

[54] APPARATUS FOR ADJUSTING COLOR TONE OF IMAGE TO BE RECORDED

[75] Inventor: Tetsuya Abe, Tokyo, Japan

[73] Assignee: Asahi Kogaku Kogyo Kabushiki Kaisha, Tokyo, Japan

[21] Appl. No.: 253,695

[22] Filed: Jun. 3, 1994

[30] Foreign Application Priority Data

Jun. 4, 1993 [JP] Japan ................................ 5-134852
Jun. 4, 1993 [JP] Japan ................................ 5-134853

[51] Int. Cl.⁶ .................................................. H04N 1/60
[52] U.S. Cl. ............................................. 358/518; 358/506
[58] Field of Search ................................... 358/518, 509, 358/510, 511, 527, 331, 515, 506, 507; 348/658, 744, 756, 757, 14, 15; 359/618, 627, 629, 369, 385; 355/38; H04N 1/60, 9/31

[56] References Cited

U.S. PATENT DOCUMENTS

| | | | |
|---|---|---|---|
| 4,812,879 | 3/1989 | Suzuki | 358/527 |
| 4,821,307 | 4/1989 | Flint, III | 348/14 |
| 4,866,513 | 9/1989 | Takahashi | 358/506 |
| 4,943,853 | 7/1990 | Morisawa . | |
| 5,099,363 | 3/1992 | Lichtman | 359/385 |
| 5,132,825 | 7/1992 | Miyadera . | |
| 5,179,478 | 1/1993 | Aoki . | |
| 5,192,961 | 3/1993 | Yoshida et al. . | |
| 5,231,433 | 7/1993 | Yoshida et al. . | |
| 5,293,188 | 3/1994 | Yoshida et al. . | |
| 5,294,990 | 3/1994 | Aoki . | |
| 5,305,029 | 4/1994 | Yoshida et al. . | |
| 5,311,322 | 5/1994 | Okino | 348/223 |

*Primary Examiner*—Edward L. Coles, Sr.
*Assistant Examiner*—Kim Yen Vu
*Attorney, Agent, or Firm*—Sandler, Greenblum & Bernstein

[57] ABSTRACT

A color adjusting apparatus is provided with a color image pickup device for picking up an object image signal and a color adjusting device for adjusting a color component of the object image signal picked-up by the color image pickup device. The apparatus is further provided with a first optical system for converging light reflected from or transmitted through the object to form a direct image of the object, a light splitting mechanism for splitting object light, and a screen located at a point of convergence of one of the bundles of rays split by the light splitting mechanism. The color image pickup device is located at a point of convergence of the other bundle of rays split by the light splitting mechanism. A positive/negative signal inverter is further provided for inverting positive or negative image signals picked-up by the color image pickup device to negative or positive image signals, respectively. An inverted image projector is provided for projecting the inverted image, which corresponds to the image signals inverted by the positive/negative signal inverter and adjusted by the color adjusting device in order to superimpose the inverted image on the direct image.

35 Claims, 10 Drawing Sheets

APPARATUS FOR ADJUSTING COLOR TONE OF IMAGE TO BE RECORDED

BACKGROUND OF THE INVENTION

1. Field of the Invention

The present invention relates to a tone control apparatus which controls or adjusts a tone of an image, which is of a two dimensional object (i.e., manuscript) such as a negative or positive film or a three dimensional object, represented by electrical image signals and displayed in a display.

2. Description of Related Art

There are known image readers in which image data, recorded on a sheet of manuscript such as a positive or negative silver salt film, is read by an image pickup device or a similar mechanism, and is then converted to electrical image signals. The electrical image signals thus obtained, are reproduced as a picture in a display, such as an LCD (i.e., Liquid Crystal Display) or CRT 15, so that the picture can be visually monitored.

However, in conventional image readers, it was impossible to directly compare the manuscript and the image thereof picked-up by the image pickup device and displayed in the same display. Namely, while the manuscript is inserted in the image reader for reading and reproducing data recorded thereon in the monitor, one cannot look at the manuscript itself in order to compare the color (i.e, tone) of the image displayed in the monitor with that of the manuscript. Consequently, it was impossible for an operator to visually observe a tone difference between the color of the manuscript (i.e., recorded image thereon) and the color of the reproduced image thereof displayed in the display (i.e., monitor). Hence, fine color or tone adjustment could not be effected by the user.

The primary object of the present invention is to provide a tone control apparatus in which, when an image of a manuscript read by an image reader and represented by electrical image signals is reproduced in a monitor, the tone of the reproduced image can be adjusted to be the same as that of the manuscript, without visually comparing the colors of the manuscript and the reproduced image thereof in the monitor.

Another object of the present invention is to provide a tone control apparatus in which, when an image of a manuscript read by an image reader and represented by electrical image signals is reproduced in a monitor, the tone of the reproduced image can be adjusted while looking at the manuscript whose image is also displayed in the monitor, in addition to the reproduced image thereof read by the image reader and represented by electrical image signals.

SUMMARY OF THE INVENTION

To achieve the object mentioned above, according to an aspect of the present invention, a color adjusting apparatus is provided with a color image pickup device for picking up an object image signal and a color adjusting device for adjusting a color component of the object image signal picked-up by the color image pickup device. The apparatus also includes a first optical system for converging light reflected from or transmitted through the object to form a direct image of the object. A light splitting the mechanism is provided for splitting object light. A screen is located at a point of convergence of one of the bundles of rays split by the light splitting mechanism, and the color image pickup device is located at a point of convergence of the other bundle of rays split by the light splitting mechanism. A positive/negative signal inverter for inverting positive or negative image signals picked-up by the color image pickup device to negative or positive image signals, respectively, is also provided. An inverted image projector projects the inverted image, corresponding to the image signals inverted by the positive/negative signal inverter and adjusted by the color adjusting device, so as to superimpose the inverted image on the direct image.

According to another aspect of the present invention, there is provided a color adjusting apparatus which includes a color image pickup device for picking up an object image signal and a color adjusting device for adjusting a color component of the object image signal picked-up by the color image pickup device. The apparatus further includes an optical system for converging light reflected from or transmitted through the object to form a direct image of the object. A light splitting mechanism is provided in the optical system for splitting the object light. A screen is located at a point of convergence of one of the bundles of rays split by the light splitting mechanism, and the color image pickup is located at a point of convergence of the other bundle of rays split by the light splitting mechanism. A display is provided in the vicinity of the screen for indicating image signals whose tone has been adjusted.

According to still another aspect of the present invention, there is provided a color adjusting apparatus which includes an optical system having a projecting lens for converging light reflected from or transmitted through an object. A transparent indicator is located at a point of convergence of object light projected by the optical system. A reflecting mechanism, provided between the projector and the transparent indicator, moves between a reading position in which the reflecting mechanism is located in a light path of the optical system to reflect the object light in a direction away from the indicator and a viewing position in which the reflecting mechanism is retracted from the light path of the optical system to permit the object light to be projected onto the indicator. A mechanism is provided for driving the reflecting mechanism between the reading position and the viewing position. Further, a color image pickup is located at a point of convergence of the object light reflected by the reflecting mechanism. Further, a tone adjusting mechanism which adjusts the tone component of the image signals picked-up by the color image pickup, and a signal processing circuit which enables the indicator to indicate the image signals whose tone has been adjusted are provided.

According to yet another aspect of the present invention, a color adjusting apparatus that includes an optical system for converging light reflected from or transmitted through an object to form a direct image of the object is provided. A transparent screen located at a point of convergence of the object light projected by the optical system is also provided. A reflecting mechanism, provided between the optical system and the transparent screen, moves between a pickup position in which the reflecting mechanism is located in a light path of the optical system to reflect the object light in a direction away from the screen, and a retracted position, in which the reflecting mechanism is retracted from the light path of the optical system to permit the object light to be projected onto the screen. A color image pickup is located at a point of convergence of the object light reflected by the reflecting mechanism at the pickup position. A tone adjusting mechanism for adjusting the tone of the image signals is also provided. A light intercepting mechanism, provided between the reflecting mechanism and the color image pickup, moves between an intercepting position, in which the light intercepting mechanism is located in the light path defined between the reflecting mechanism and the color image pickup to intercept the object light, and an open position, in which the light intercepting mechanism is retracted from the light path defined between the reflecting mechanism and the color image pickup. A signal processing circuit outputs the image signals, whose tone has been adjusted, through an outputting mechanism. An image forming lens converges the object light, reflected toward the screen by the reflecting mechanism located at the pickup position, onto the screen. A driving mechanism moves the reflecting mechanism and the light intercepting mechanism in an associative manner.

The present disclosure relates to subject matter contained in Japanese patent application Nos. 05-134852 and 05-134853 (filed on Jun. 4, 1993) which are expressly incorporated herein by reference in their entirety.

BRIEF DESCRIPTION OF THE DRAWINGS

The invention will be described below in detail with reference to the accompanying drawings, in which.

DESCRIPTION OF THE PREFERRED EMBODIMENT

In the illustrated embodiments discussed below, information recorded on the manuscript is converted to image signals comprised of color signals R, G and B to be recorded, and the tone adjustment is effected by an independent gain control of the color signals R and B or by a gain balance control such as a white balance control.

First Embodiment

Figure 1:
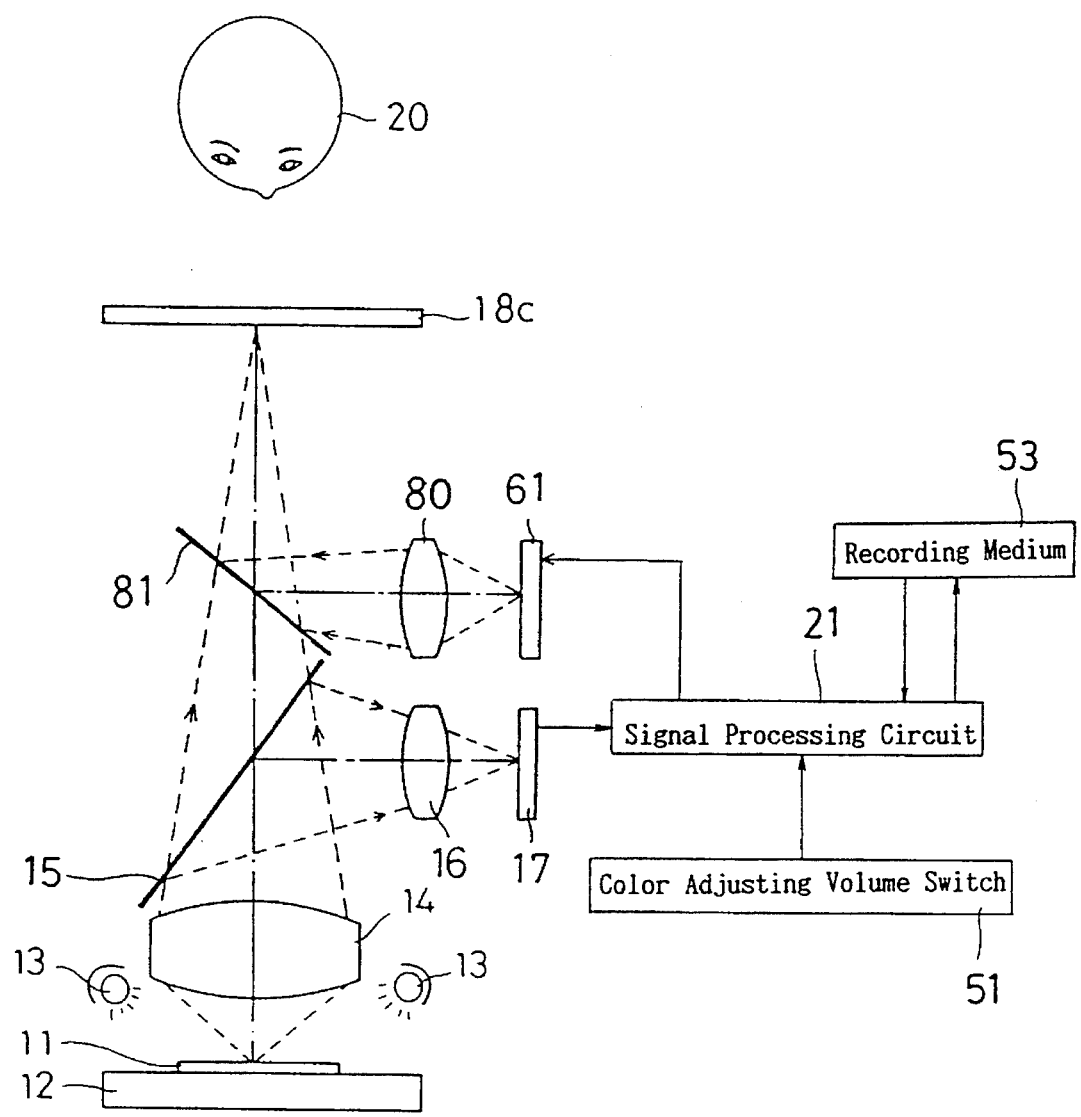
FIG. 1 is a schematic view of a main part of an optical system of a tone control apparatus according to a first embodiment of the present invention.
Figure 2:
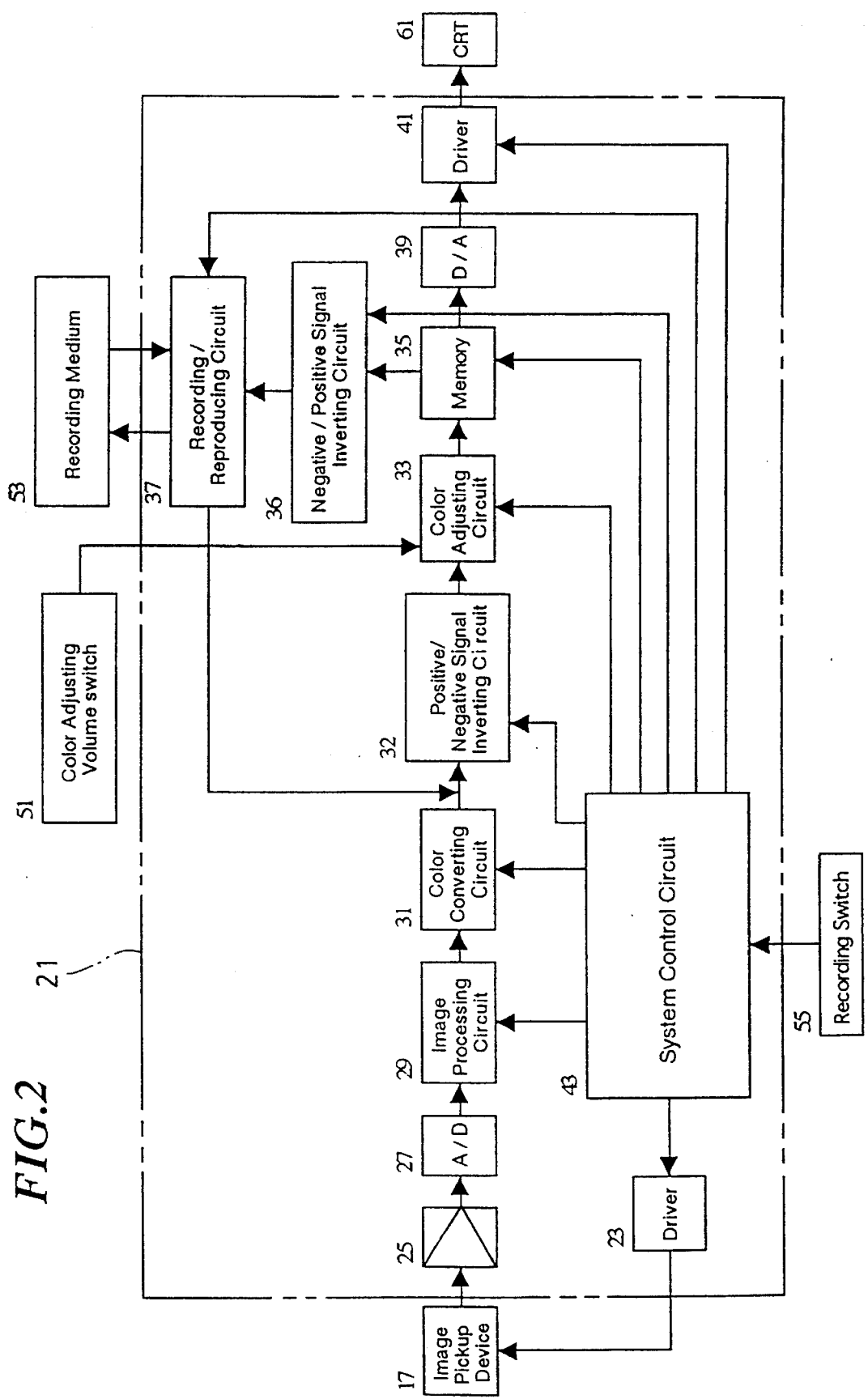
FIG. 2 is a block diagram of a main part of a control system of a tone control apparatus shown in FIG. 1.

FIG. 1 shows a first embodiment of an optical system of a tone control apparatus according to the present invention, and FIG. 2 is a block diagram of a main part of a control circuit of the tone control apparatus shown in FIG. 1.

In the arrangement shown in FIG. 1, a manuscript 11, such as a positive film, is located on a light box 12, which functions not only to illuminate a transparent manuscript but also to support thereon the manuscript 12. The transparent manuscript is uniformly illuminated with illuminating light emitted from a plurality of light emitters (not shown) provided in the light box 12 and onto the lower surface of the manuscript. Light emitted through the manuscript 11 is transmitted through a projecting lens 14. The projecting lens 14 serves as a first optical system, and is provided above the light box 12. The transmitted light is then made incident upon a first half mirror 15. The light incident upon the first half mirror 15 is partly reflected thereby and is converged onto a light receiving surface of an image pickup device 17 by an image forming lens 16. The image pickup device 17 is made of a color CCD whose drive control, such as the accumulation of electric charges and data reading operation, etc., is effected in accordance with the drive pulses outputted by a driver 23 (FIG. 2).

Light transmitted through the first half mirror 15 is made incident upon a second half mirror 81 and transmitted therethrough. The light transmitted through the second half mirror 81 is projected onto a transparent screen 18c to form an enlarged image. The enlarged image (which will be referred to as a direct image) thus formed on the screen 18c can be viewed by an operator (i.e., viewer) 20 from behind the screen 18.

In the case that the manuscript 11 is an opaque manuscript which is, for example, printed on a sheet of paper, the manuscript 11 located on the light box 12 is illuminated with light emitted from a lighting device (or devices) 13 provided on the same side of the manuscript 11 as the projecting lens 14. The light box 12 has a similar light source as the lighting device 13. Accordingly, there is no change in the color tone of the manuscript depending on the light source.

Although the projecting lens 14 is made of a single lens in the illustrated embodiment, it is possible to provide an automatic focusing function and/or a zoom function in the projecting lens 14.

The image of the manuscript formed on the image pickup device 17 is converted to and read as electrical image signals which are fed to a signal processing circuit 21. The signal processing circuit 21 inverts positive data (i.e., data of positive film 11) or negative data (i.e., data of negative film 11) to negative data or positive data and displays the inverted data in a CRT 61. The inverted image thus displayed in the CRT 61 is reflected by the second half mirror 81 through an image forming lens 80 and is converged onto the screen 18c to form a second inverted image. Later, the negative or positive image signals whose tone has been manually adjusted are again inverted to positive or negative image signals and recorded on a recording medium 53.

In other words, the signal processing circuit 21 converts the color components of the inputted color video signal into complementary color components of the color components, and generates an inverted signal whose color components are inverted relative to those of the input signal. The negative data mentioned in this embodiment refers to the data in which the color components of the positive data are converted into complementary components. The inverted image mentioned in this embodiment refers to the image in which the color components are converted into complementary color components.

The image, whose color components have been inverted and formed on the screen 18c through the CRT 61, is controlled, according to the image magnification ratio of the image forming lens 16 and the screen 18c and further according to the sequence of signal-reading from the image pickup device 17, so that the image is completely superimposed on the direct image with the same direction and size.

Namely, the positive or negative direct image of the manuscript 11 and the respective inverted negative or positive image thereof concurrently overlap each other on the screen 18c. Consequently, if the color adjustment is precisely carried out such that the color represented by the color signal of each of the pixels which constitute the inverted image is complementary to the color of the corresponding direct image, the screen 18c becomes uniformly gray.

The control circuit of the image reading system will be described below with reference to FIG. 2.

The image pickup device 17 is made of a color CCD whose drive control, such as the accumulation of electric charges and data reading operation, etc., is effected in accordance with drive pulses outputted by a driver 23. The image signals (i.e., color signals R, G and B) which are read by the image pickup device 17 and converted to the electric signals thereby are: amplified by an amplifier 25; converted to digital signals by an A/D converter 27; subject to an imaging process, such as a synchronization by an image signal processing circuit 29; and are subject to a white balance adjustment by a color converting circuit 31.

In the positive/negative inversion process at a positive/negative signal inverting circuit 32, the video signal, which is adjusted with the normal white balance adjustment, is converted into the components of R, G, and B of the complementary colors (i.e., cyan, magenta, and yellow signals) relative to the color signals of R, G, and B. The inverted signals are combined with respective complementary color components and output to the color adjusting circuit 33 as RGB signals of the image in which the color components of the original image are converted into those of the complementary colors. It should be understood that the output signals from the positive/negative signal inverting circuit 32 are not the cyan, magenta, and yellow signals, but are the RGB signals. For example, suppose a manuscript has only the R signal, in this case the R, G, B components of an original video signal, before the R signal goes into the positive/negative signal inverting circuit 32, are indicated as a binary signal (1, 0, 0). As the complementary color of R is cyan, cyan is indicated as a binary signal (0, 1, 1). The RGB signal of the original video signal (1, 0, 0) is consequently converted into the RGB signal of the complementary color (0, 1, 1).

The color adjusting circuit 33 is provided with a color adjusting volume switch 51 which is rotated to adjust the balance of amplification of the inverted color signals R and B. The inverted color signals outputted from the color adjusting circuit 33 are successively stored in a memory 35.

When the inverted color signals for one picture plane are written in the memory 35, the inverted color signals are then successively read therefrom and converted to analog signals by a D/A converter 39. Consequently, the CRT 61 is driven by a driver 41 in accordance with the inverted image signals, and the inverted image is indicated in the CRT 61. The inverted image in the CRT 61 is projected onto the screen 18c through the imaging lens 80 and the second half mirror 81, as mentioned above. Consequently, the inverted image formed on the screen 18c is superimposed on the direct image of the manuscript 11 which is projected onto the screen 18c through the projecting lens 14. The CRT can be replaced with a liquid crystal projector.

Thus, the operator 20 rotates the color adjusting volume switch 51 to adjust the tone until the image on the screen 18c becomes uniformly gray, while looking at the composite image of the direct image and the inverted image on the screen 18c. When a gray screen is established, the direct image is substantially complementary to the inverted image, i.e., image signals which perfectly reproduce the recorded data of the manuscript are obtained.

Upon completion of the tone adjustment, a recording switch 55 is turned ON by the operator, so that a system control circuit (i.e., system controller) 43 reads the inverted image signals whose tone has been adjusted from the memory 35 and outputs the same to the negative/positive signal inverting circuit 36 which inverts (or returns) the inverted image signals having the adjusted tone, inputted thereto to positive image signals. Consequently, a recording/reproducing circuit 37 records the positive image signals having the adjusted tone on the recording medium 53 in an optional recording format including various image formats for personal computers, or NTSC system for a television. The recording/reproducing circuit 37 includes corresponding converting circuits therefor. Alternatively, it is possible to record the inverted image signals without inverting the same again to the positive image signals.

The above-mentioned discussion has been directed to the recording operation to record the image data recorded on the manuscript onto the recording medium 53. It is also possible to read the image data recorded on the recording medium through—the recording/reproducing circuit 37 to thereby indicate and project the same through the positive/negative signal inverting circuit 32, the tone (i.e., color) adjusting circuit 33, the memory 35, the D/A converter 39, and the driver 41 in the CRT 61 and on the screen 18c, respectively. Consequently, the image thus formed on the screen 18c is superimposed on the direct image of the manuscript on the screen 18c. Thereafter, it is possible for the operator to actuate the color adjusting volume switch 51 in order to adjust the tone or color, while observing the composite image on the screen to thereby record the image signals whose tone has been adjusted on the same recording medium or a different recording medium, as different signals.

As can be understood from the foregoing, in the embodiment mentioned above, the direct image of (the recorded data of) the manuscript is superimposed on the inverted image which is obtained by inverting the positive or negative image signals, which represent the recorded data of the manuscript that are picked-up by the image reader. If the inverted image is a perfectly inverted image of the direct image, the composite image is a uniformly gray image. Conversely, if the inverted image is not a perfect inversion of the direct image, the composite image will have a certain degree of color saturation, depending on the degree to which the direct image and the inverted image deviate from complementary colors. Hence, it is possible for the operator 20 to record the image signals that perfectly reproduce the color of the manuscript 11 onto the recording medium 53 merely by actuating the color adjusting volume switch 51 to obtain a uniformly gray composite image on the screen.

The following discussion will be directed to three different embodiments (i.e., second, third and fourth embodiments) of the present invention (FIGS. 3 through 11).

Second Embodiment

In the first embodiment mentioned above and illustrated in FIGS. 1 and 2, the direct image of the manuscript, which is subject to no electric conversion process, is superimposed on the picked-up image (i.e., inverted image) thereof which has been subject to an electric signal inversion process to form a composite image on the screen. In the second through fourth embodiments discussed below, the direct image and the picked-up image are separately formed on respective screens or displays that are located close to each other, so that the operator can visually compare the direct image and the picked-up image simultaneously.

In the modified embodiments, the components corresponding to those in the first embodiment, and shown in FIGS. 1 and 2, are designated with like reference numerals. Accordingly, no detailed explanation therefor will be given herein for those corresponding components.

Figure 3:
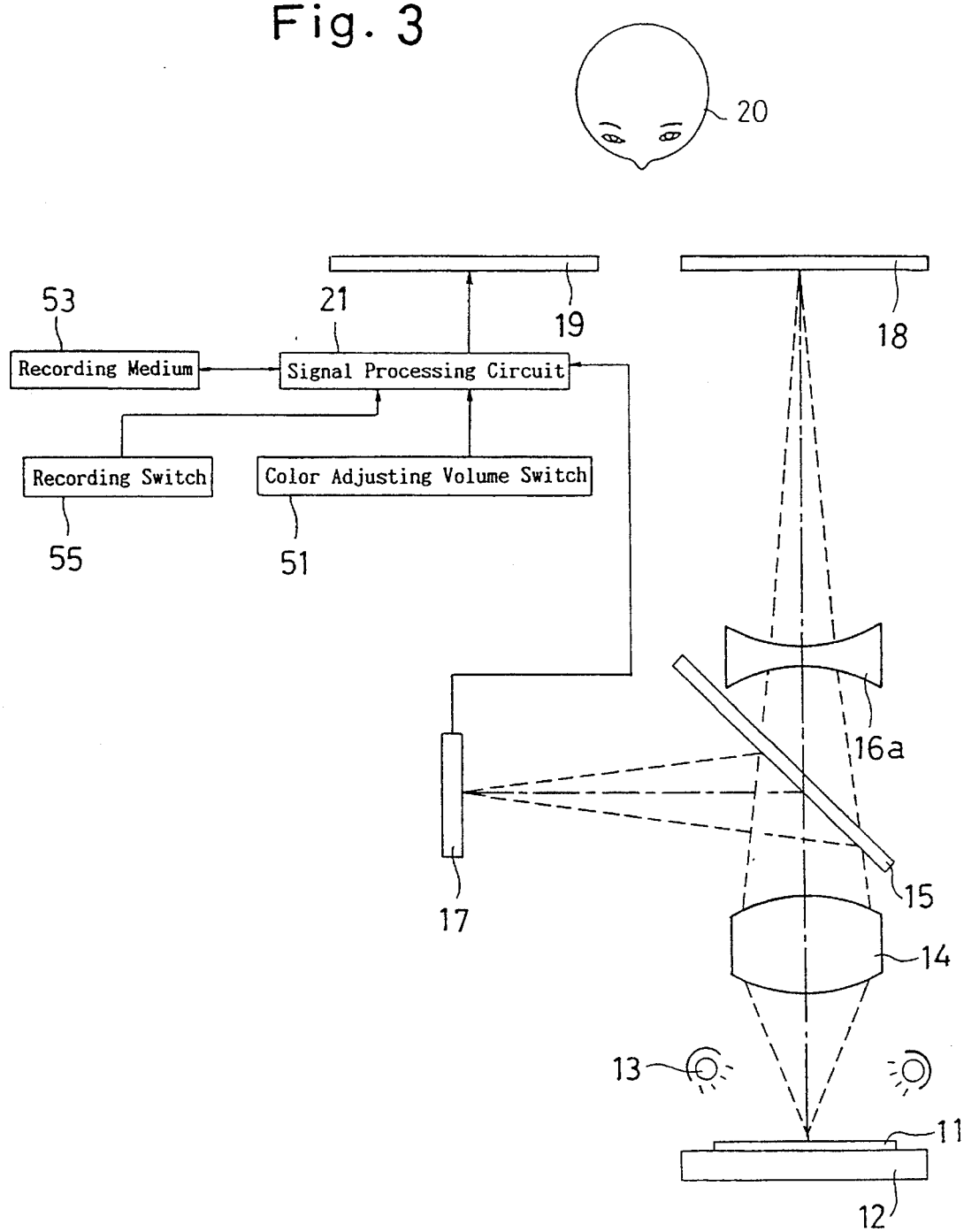
FIG. 3 is a schematic view of a main part of an optical system of a tone control apparatus according to a second embodiment of the present invention.
Figure 4:
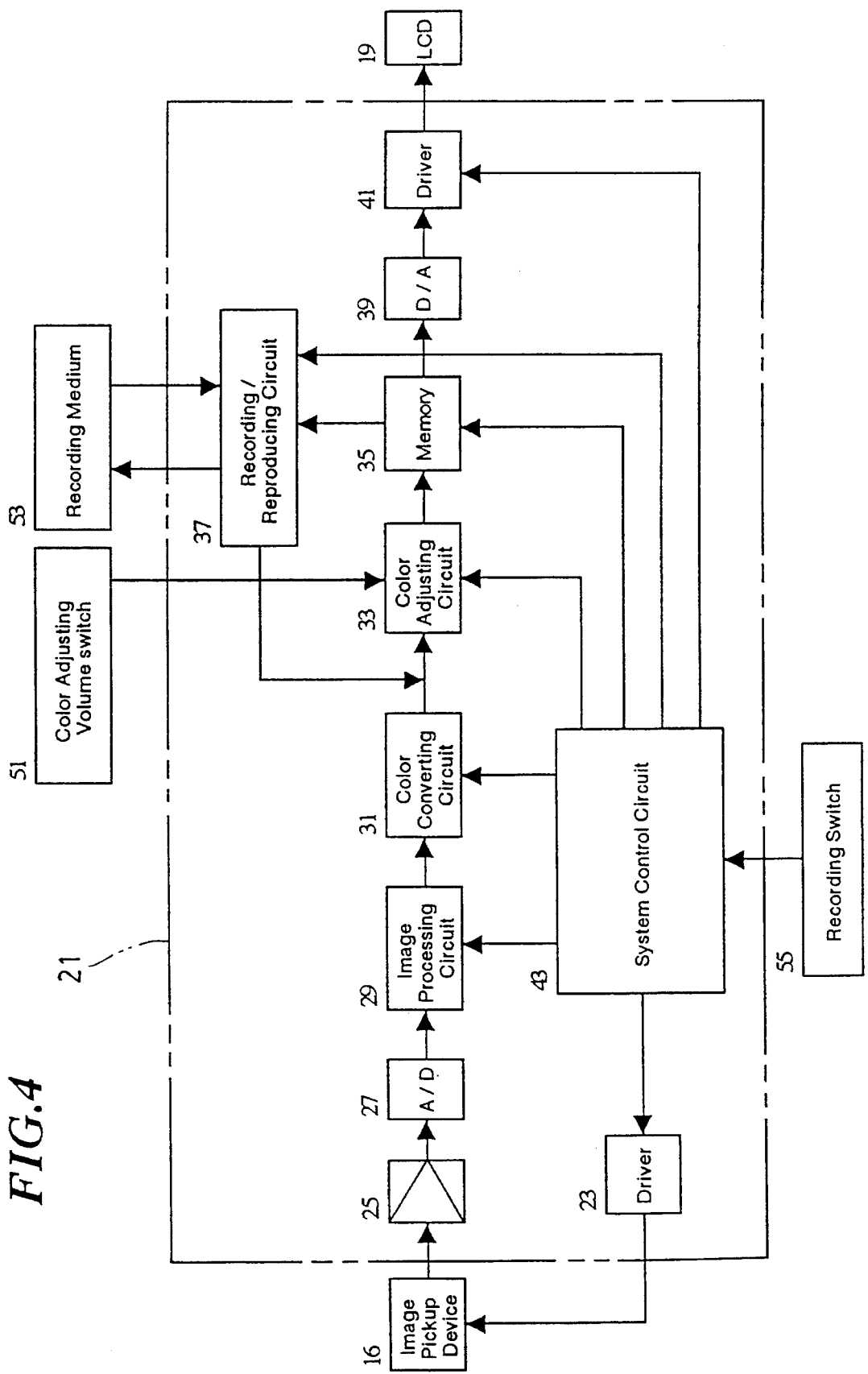
FIG. 4 is a block diagram of a main part of a control system of a tone control apparatus shown in FIG. 3.

FIGS. 3 and 4 illustrate the second embodiment of the present invention and correspond to FIGS. 1 and 2 of the first embodiment, respectively.

In the arrangement shown in FIG. 3, the manuscript 11 (e.g., positive film) located on the light box 12 is uniformly illuminated, with illuminating light emitted from a plurality of light emitters (not shown) provided in the light box 12, onto the lower surface of the manuscript. Light emitted through the manuscript 11 is transmitted through the projecting lens 14, which act as an image forming optical system and is provided above the light box 12, and is made incident upon the half mirror 15. The light incident upon the half mirror 15 is partly reflected thereby and the reflected light is converged onto the light receiving surface of the image pickup device 17. On the other hand, light transmitted through the half mirror 15 is made incident upon the transparent screen 18 through the enlarging projection lens 16a to form an enlarged image. The enlarged image (i.e., the direct image) formed on the screen 18 can be viewed by the operator (i.e, viewer) 20 from behind the screen.

It should be noted that the magnification of the image by the projecting lens 14 and the enlarging projection lens 16a is arranged to be the same as that of an image transmitted from image pickup device 17 and formed on the LCD 19.

In the case that the manuscript 11 is an opaque manuscript which is, for example, printed on a sheet of paper, the manuscript 11 (located on the light box 12) is illuminated with light emitted from the lighting device (or devices) 13 which is provided on the same side of the manuscript 11 as the projecting lens 14. The light box 12 has a light source similar to the lighting device 13, so that there is no change in the color tone of the manuscript depending on the light source.

Although the projecting lens 14 is made of a single lens in the illustrated embodiment, it is possible to provide an automatic focusing function and/or a zoom function in the projecting lens 14.

The image of the manuscript formed on the image pickup device 17 is converted to and read as electrical image signals before being fed to the signal processing circuit 21. The electrical image signals are subsequently displayed as a picture image in the LCD 19 (i.e., liquid crystal display) and recorded on the recording medium 53. The LCD 19 lies in substantially the same plane as the screen 18, so that the image formed in the LCD 19 and the image formed on the screen 18 have the same magnification and direction. Hence, the viewer 20 can visually compare the direct image formed on the screen 18 and the image in the LCD 19 that has been picked-up by the image pickup device 17.

The image signals (i.e., color signals R, G and B) which are read by the image pickup device 17 and converted to the electric signals thereby are amplified by the amplifier 25; converted to digital signals by the A/D converter 27; subject to an imaging process, such as a synchronization by the image signal processing circuit 29; and are subject to a white balance adjustment by the color converting circuit 31.

After the normal white balance adjustment is completed, the color signals R, G and B of the image signals are inputted to the color adjusting circuit 33. The color adjusting circuit 33 is provided with the color adjusting volume switch 51 which is rotated to carry out the gain control of the color signals. The image signals (i.e., color signals) outputted from the color adjusting circuit 33 are successively stored in the memory 35.

When the image signals for one picture plane are written in the memory 35, the image signals are then successively read therefrom and converted to analog signals by the D/A converter 39. Consequently, the LCD 19 is driven by the driver 41 in accordance with the image signals, so that the image is indicated in the LCD 19.

Thus, the operator 20 rotates the color adjusting volume switch 51 to adjust the color (i.e., tone) of the photographed image in the LCD 19 and, accordingly, the color of the image signals, while looking at the photographed image in the LCD 19 and the direct image optically indicated on the screen 18.

The operations of the image pickup device 17 and the signal processing circuit 21 are generally controlled by the system controller 43.

Upon completion of the color (i.e., tone) adjustment, the recording switch 55 is turned ON by the operator, so that the system controller 43 outputs the image signals read from the memory 35 to the recording/reproducing circuit 37. The latter records the image inputted thereto on the recording medium 53. Consequently, the image signals whose tone has been perfectly reproduced can be recorded in an optional recording format including various image formats for personal computers, or NTSC system for a television. The recording/reproducing circuit 37 includes corresponding converting circuits therefor.

The above-mentioned discussion has been directed to the recording operation to record the image data recorded on the manuscript 11 onto the recording medium 53. It is also possible to read the image data recorded on the recording medium 53 through the recording/reproducing circuit 37 to thereby indicate the same in the LCD 19 through the tone (i.e., color) adjusting circuit 33, the memory 35, and the driver 41. Consequently, the operator can adjust the tone, while visually comparing the photographed image formed in the LCD 19 and the direct image formed on the screen 18.

Third Embodiment

Figure 5:
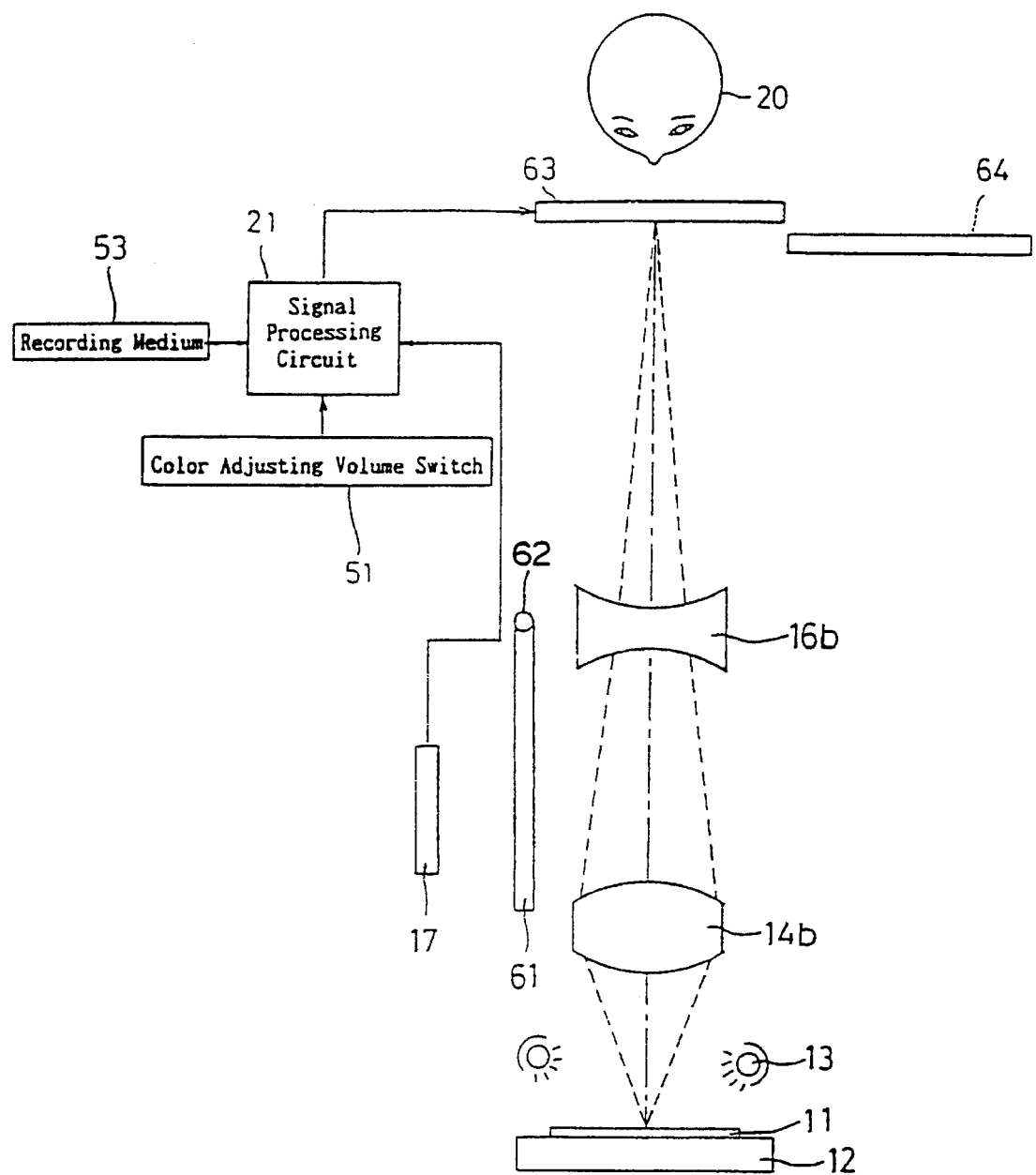
FIG. 5 is a schematic view of a main part of an optical system of a tone control apparatus according to a third embodiment of the present invention.
Figure 6:
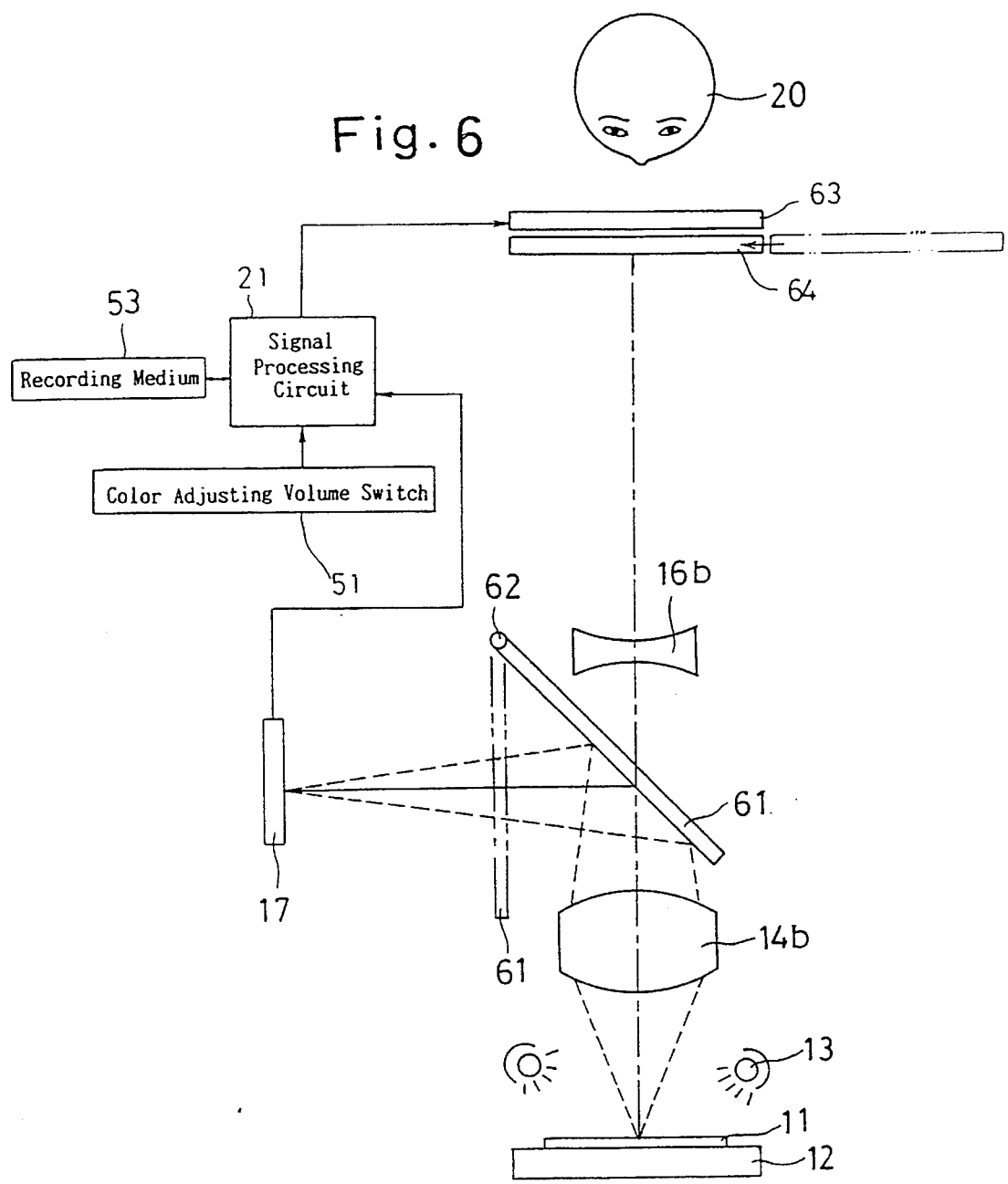
FIG. 6 is a schematic view of a main part of an optical system of a tone control apparatus according to a third embodiment of the present invention, at a different position.
Figure 7:
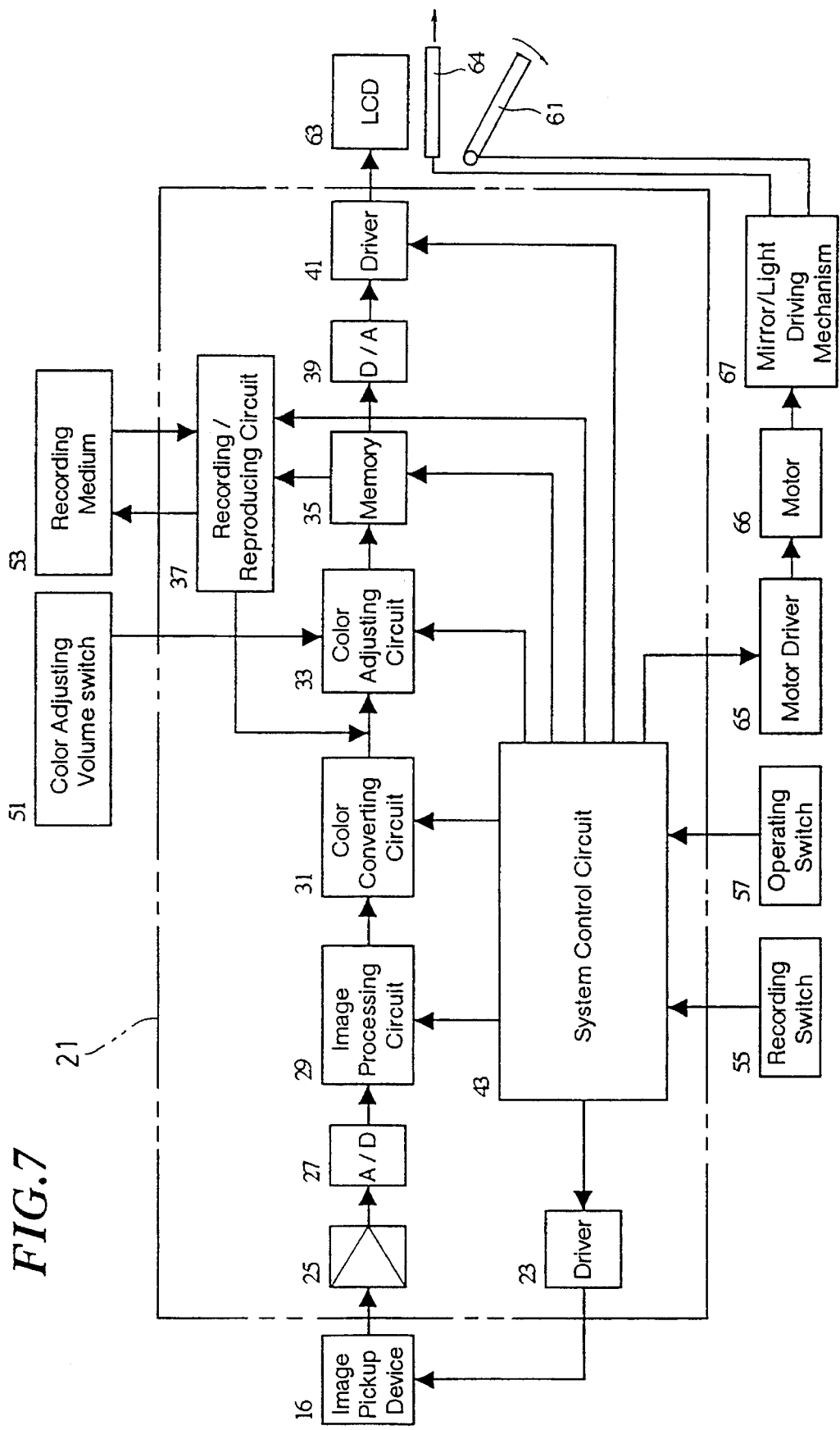
FIG. 7 is a block diagram of a main part of a control system of a tone control apparatus shown in FIG. 5.
Figure 8:
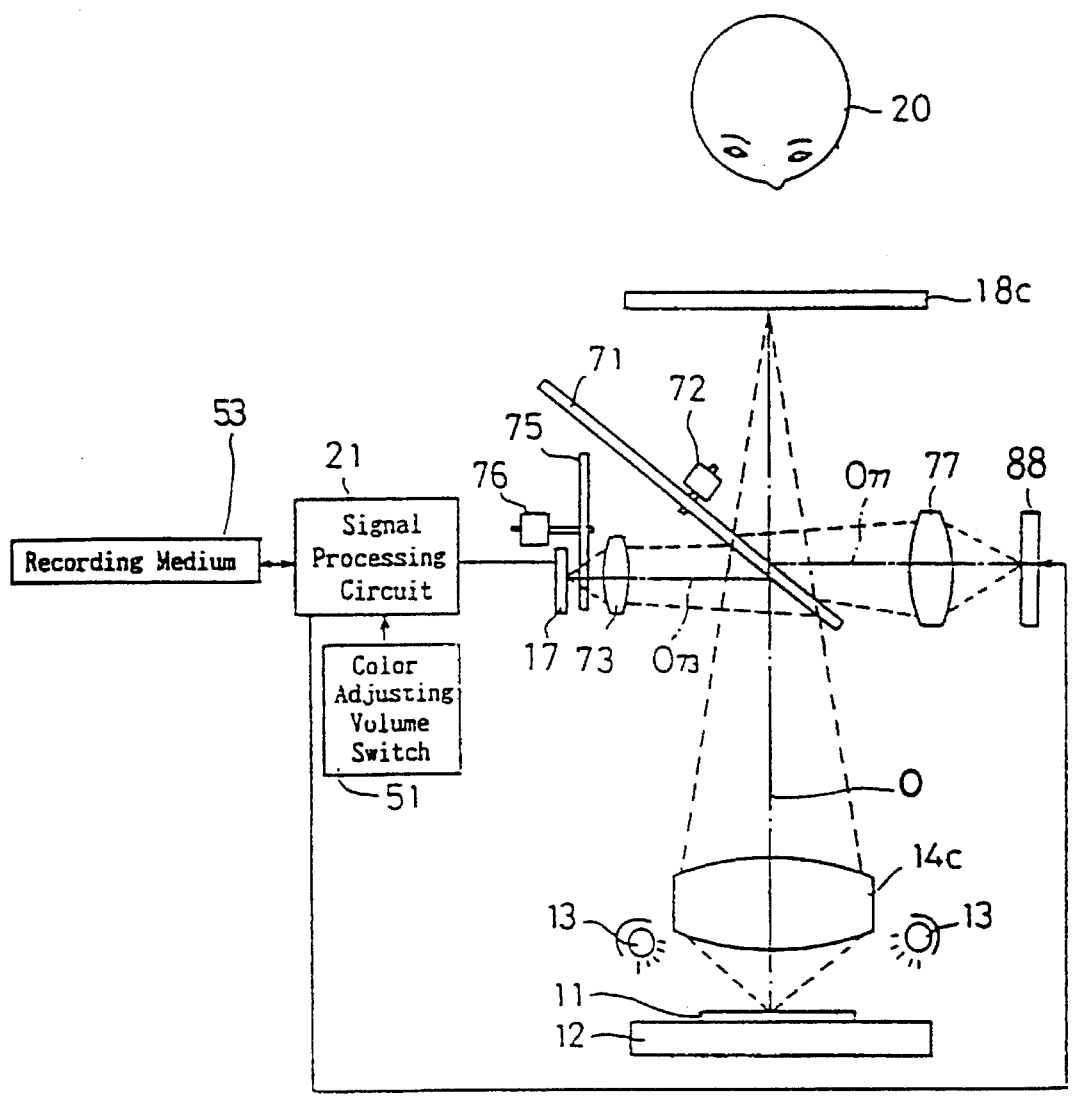
FIG. 8 is a schematic view of a main part of an optical system of a tone control apparatus according to a fourth embodiment of the present invention.

The third embodiment of the present invention will be described below, with reference to FIGS. 5, 6 and 7.

The third embodiment is characterized by the LCD 63 which constitutes not only the projecting screen, but also an indicating means of the picked-up image signals.

Light reflected by or transmitted through the manuscript 11 is projected onto the transparent LCD 63 through the projecting lens 14b and the enlarging and imaging lens 16b. The operator 20 can view the direct image formed in the LCD 63 from behind the LCD.

There is a movable mirror 61 between the projecting lens 14b and the LCD 63 which rotates about a shaft 62 secured to the body (not shown) of the image reader to thereby selectively occupy a viewing position and a pickup/monitor position. When the movable mirror 61 is in the viewing position, as shown in FIG. 5, to view the direct image, the movable mirror 61 is retracted from the optical path defined between the projecting lens 14b and the enlarging and image forming lens 16b so that light transmitted through the projecting lens 14b does not enter the image pickup device 17. In the pickup/monitor position shown in FIG. 6, the movable mirror 61 lies in the light path between the projecting lens 14b and the enlarging and image forming lens 16b to reflect the light transmitted through the projecting lens 14b toward the pickup device 17, so that the light is converged onto the light receiving surface of the pickup device 17.

Also, there is a back light 64 between the LCD 63 and the enlarging and imaging lens 16b. The back light 64 is movable to selectively occupy a monitor position (FIG. 6), in which the back light is substantially aligned with the LCD 63 to intercept light which would otherwise enter the LCD, and a viewing position (FIG. 5), in which the back light is retracted from the light path defined between the LCD 63 and the enlarging and image forming lens 16b to open the back surface of the LCD 63. The back light 64 is of substantially the same construction as the light box 12. The light emitters provided in the back light 64 have identical color components.

The movable mirror 61 and the back light 64 are driven in association with each other by a mirror/light driving mechanism 66 (FIG. 7), so that when the movable mirror 61 is in the viewing position and the pickup/monitor position, the back light 64 is in the viewing position and the monitor position, respectively. The mirror/light driving mechanism 67 is driven by a motor 66 which is in turn driven by the system controller 43 through a motor driver 65. The switching operation of the movable mirror 64 between the viewing position and the pickup/monitor position is effected by an operation switch 57 which is manually actuated by the operator.

The image reader, as constructed above, operates as follows.

The operator 20 moves the operation switch 57 to the viewing position to view the direct image of the manuscript projected onto the LCD 63. Namely, in the viewing position, since the mirror 61 and the back light 64 are retracted from the light path, the direct image of the manuscript 11 is formed in the LCD 63, so that the direct image can be viewed by the operator.

Thereafter, the operator switches the operation switch 57 to the pickup/monitor position. In response thereto, the system controller 43 drives the mirror motor 66 through the motor driver 65 to the pickup/monitor position. The rotation of the mirror motor 66 causes the mirror 61 to rotate to the pickup/monitor position through the mirror/light driving mechanism 67. Accordingly, the back light 64 is slid to the pickup/monitor position to cover the back surface of the LCD 63. The system controller 43 also drives the image pickup device 17 and the signal processing circuit 21 to pick up the recorded data of the manuscript 11 to thereby indicate the picture image in the LCD 63. The operator 20 can view the picked-up image indicated in the LCD 63 and illuminated by the back light 64. Thus, the operator 20 rotates the color adjusting volume switch 51 to control the tone of the picked-up image, while looking at the picked-up image indicated in the LCD 63.

Moreover, the operator 20 repeatedly actuates the operation switch 57 to visually compare the direct image of the manuscript and the picked-up image thereof monitored in the LCD 63 to thereby obtain a tone of the picked-up image which is optimally identical to the tone of the direct image. Upon completion of the tone (i.e., color) adjustment, the operator 20 actuates the recording switch 55 to record the picked-up image data indicated in the LCD 63, onto the recording medium 53.

Fourth Embodiment

The fourth embodiment of the present invention is shown in FIGS. 8 through 11. In the fourth embodiment, both the direct image of the manuscript and the reproduced image (i.e., picked-up image) thereof are alternately projected onto the same screen.

The direct image of the manuscript 11 illuminated by the light box 12 or the lighting device 13 is formed on the screen 18c through the projecting lens 14c. There is a first sector shutter 71 provided between the projecting lens 14c and the screen 18c. The first sector shutter 71 is inclined at an inclination angle of 45° with respect to the optical axis O. Light of the manuscript transmitted through the projecting lens 14c is reflected by the first sector shutter in a reflection direction perpendicular to the optical axis 0. In the reflection direction, there are an imaging lens 73, a second sector shutter 75 having a shutter surface normal to the optical axis ($O_{73}$) of the light reflected by the first sector shutter 71, and an image pickup device 17, arranged in this order.

Figure 9:
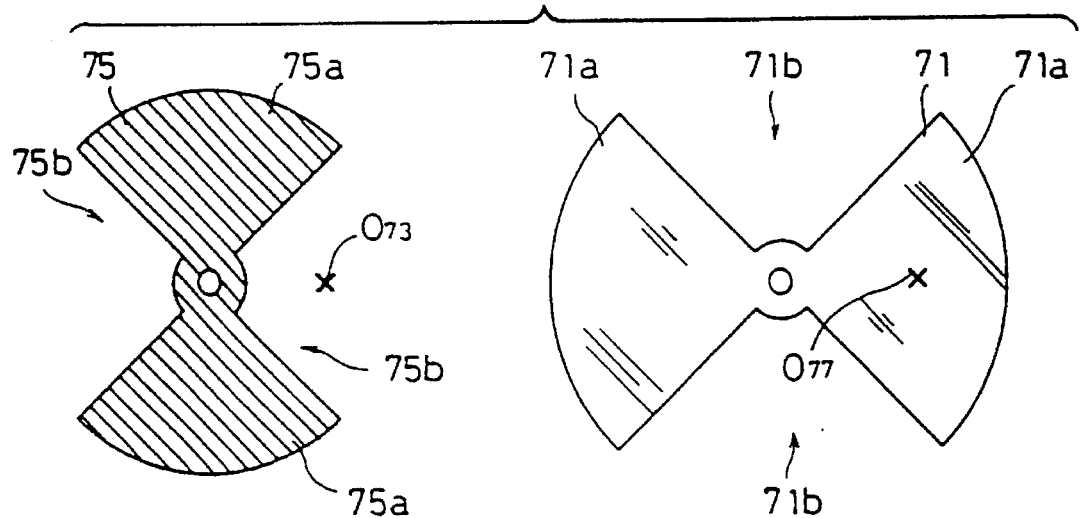
FIG. 9 shows sector shutters in a tone control apparatus shown in FIG. 8, at a photographing position.
Figure 10:
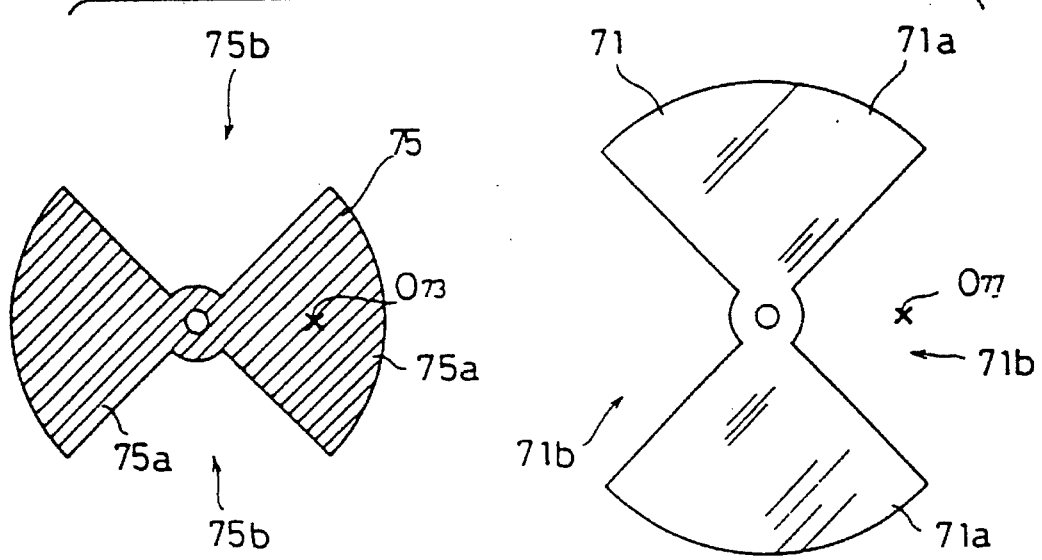
FIG. 10 shows sector shutters in a tone control apparatus shown in FIG. 9, at a position different from FIG. 9; and, FIG. 11 is a block diagram of a main part of a control system of a tone control apparatus shown in FIG. 10.
Figure 11:
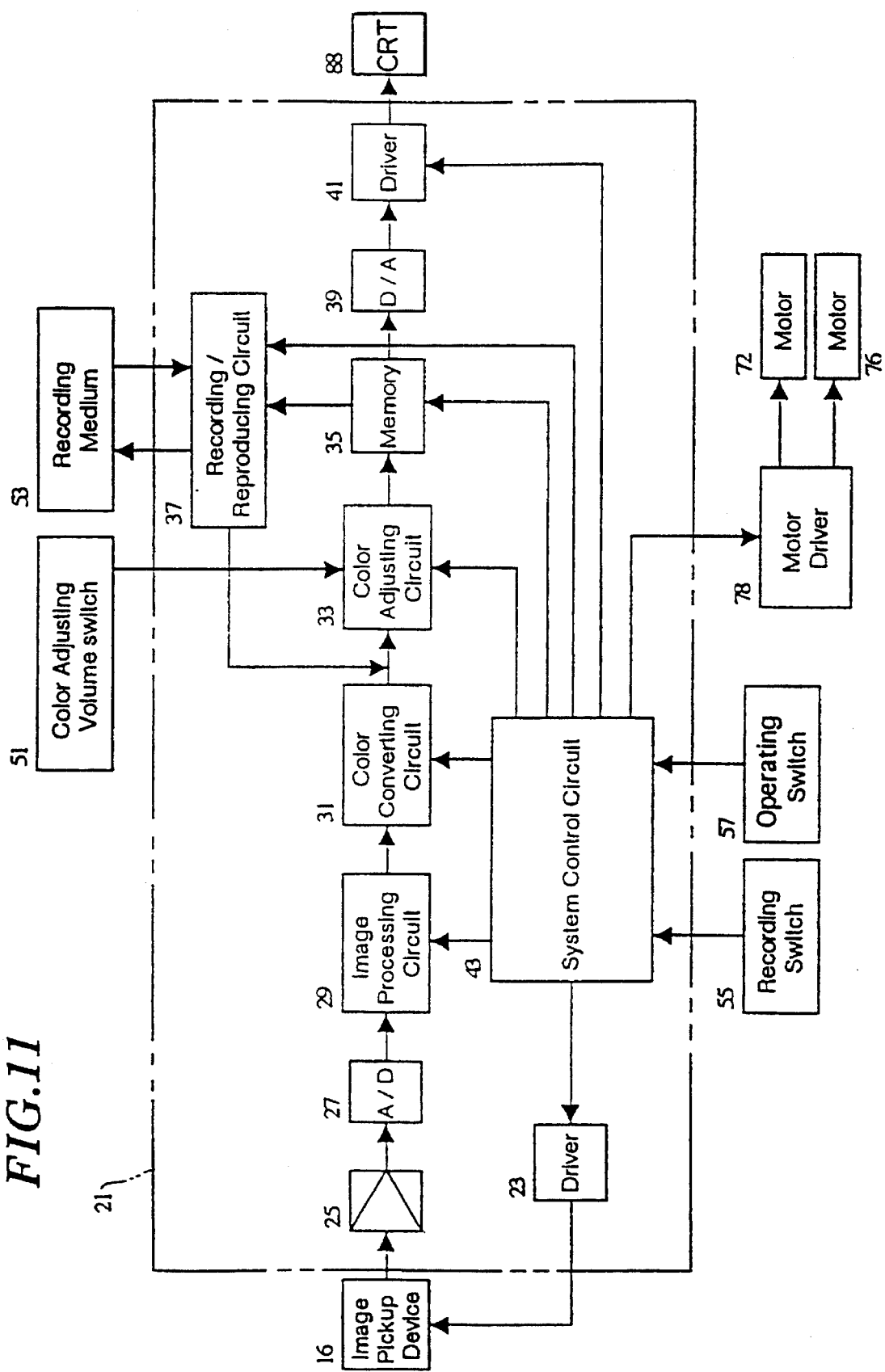

As can be seen in FIGS. 9 and 10, the sector shutters 71 and 75 are provided with two sector blades respectively 71a, 71a and 75a, 75a whose center angle is 90°, and two openings 71b, 71b and 75b, 75b defined by and between the corresponding sector blades 71a and 75a, respectively. The opposite surfaces of the blades 71a of the first sector shutter 71 are mirror surfaces to reflect light incident thereupon. The opposite surfaces of the blades 75a of the second sector shutter 75 are subject to an anti-reflection treatment or a light absorbing treatment to absorb light incident thereupon. Namely, the blades 71a function as a mirror plate and the blades 75a function as a light intercepting plate.

The CRT display 88 is located on the back surface side of the first sector shutter 71 (i.e., reflecting surface angularly facing the CRT display 88) to indicate the image of the manuscript 11 picked up by the image pickup device 17. The projecting lens 77 is provided between the CRT display 88 and the first sector shutter 71, so that the light of the image emitted from the CRT display 88 is reflected by the first sector shutter 71 through the projecting lens 77 and then converged onto the screen 18c. The operator 20 can view the image formed on the screen 18c.

The sector shutters 71 and 75 are driven by the mirror motors 72 and 76, which are in turn controlled by the system controller 43 through the motor driver 78, so as to synchronously rotate at a step of 90°, respectively. The sector shutters 71 and 75 are constructed such that, when the first sector shutter 71 intercepts the viewing light path $O_{77}$ (i.e., optical axis of the projecting lens 77), the second sector shutter 75 opens the picking-up light path $O_{73}$ (i.e., optical axis of the imaging lens 73), as shown in FIG. 9. When the first sector shutter 71 opens the viewing light path $0_{77}$, the second sector shutter 75 intercepts the picking-up light path $0_{73}$, as shown in FIG. 10.

The first sector shutter 71 utilizes reflection of both shutter plates. One of the plates leads an image of a manuscript to the image pickup device 17. The other plate leads an image of the CRT 88 to the screen 18c. The second sector shutter 75 functions to prevent emission of unnecessary light from the CRT through the image pickup device 17 when the direct image is projected onto the screen 18. It should be understood that the image forming lens 73 and the projection lens 77 are arranged to make the size of the image projected from the CRT 88 onto the screen 18c identical with the size of the image of the direct image projected onto the screen 18c.

The operation of the fourth embodiment is as follows.

When the operation switch 57 is turned ON, the system controller 43 drives the motors 72 and 76 through the motor driver 78. When the sector shutters 71 and 75 open and close the picking-up light path $O_{73}$ and the viewing light path $O_{77}$, respectively, the manuscript image converged onto the image pickup device 17 is read and subject to the predetermined signal processes by the signal processing circuit 21. The light of the manuscript image which is indicated in the display 88 is transmitted through the projecting lens 77 and reflected by the blades 71a of the first sector shutter 71 toward the screen 18c. Consequently, the picked-up image formed on the screen 18c can be observed by the operator 20.

When the motors 72 and 76 stop after they rotate by 90°, the picking-up light path $O_{73}$ is intercepted and the viewing light path $O_{77}$ is opened (FIG. 10), respectively. Namely, the direct image of the manuscript 11 is formed on the screen 18c through the projecting lens 14c.

As mentioned above, in the image reader according to the fourth embodiment, the direct image of the manuscript 11 and the picked-up image thereof are alternately or selectively indicated on the same screen 18c. Accordingly, the operator 20 can observe the direct image and the picked-up image without moving his or her line of sight to manually carry-out the tone control thereof.

It is possible to intermittently or continuously rotate the motors 72 and 76 at a variable predetermined speed. Alternatively, the motors 72 and 76 can be made of ones which rotate by 90° every time the operation switch 57 is turned ON. The opening and closing means for the picking-up light path $O_{73}$ and the viewing light path $O_{77}$ is not limited to the illustrated sector shutters 71 and 75 and can be realized, for example, by reciprocally sliding shutters or linearly movable plates, etc., as shown in FIGS. 5 and 6.

Although the above discussion has been addressed to the image pickup of the two dimensional manuscript, the present invention can be adapted to pickup an image of a three dimensional object to thereby adjust the tone or color thereof.

As can be understood from the above discussion, according to the present invention, the direct image which is not subject to an electrical conversion process and the picked-up image which is converted to electric signals and reproduced based thereon are formed close to each other, so that the images can be directly compared or observed to adjust the tone thereof.

In particular, according to the second embodiment of the present invention, the screen, on which the direct image of the manuscript which is not converted to electrical signals is projected, is used also as an indicating means for indicating thereon the picked-up image which is to be converted to electrical signals, so that the direct image and the picked-up image are alternately indicated on or in the same screen or indicating means, a precise tone adjustment of the image can be effected.

Furthermore, according to the third embodiment of the present invention, the direct image and the picked-up image are alternately indicated in the same picture plane, a precise tone adjustment of the image can be effected.

Furthermore, according to the fourth embodiment of the present invention, the direct image and the picked-up image are alternately projected onto the same screen so that a precise tone adjustment of the image can be effected. Furthermore, the image signals of the manuscript having tone signal components that have been adjusted so as to perfectly reproduce the tone of the manuscript can be recorded on a recording medium.

I claim:

1. A color adjusting apparatus that includes color image pickup means for picking-up an object image signal of an object and color adjusting means for adjusting a color component of said object image signal picked-up by the color image pickup means, said color adjusting apparatus comprising:

an optical system for converging light that is one of reflected from or transmitted through the object, to form a direct image of the object;

light splitting means for splitting object light;

a screen located at a point of convergence of a bundle of rays of light split by said light splitting means;

said color image pickup means being located at a point of convergence of another bundle of rays of light split by said light splitting means;

signal inverting means for inverting object image signals picked-up by said color image pickup means; and inverted image projecting means for projecting an inverted image, corresponding to said object image signals inverted by said signal inverting means and adjusted by said color adjusting means, to superimpose said inverted image on said direct image.

2. The color adjusting apparatus of claim 1, wherein said signal inverting means inverts color components of color image signals picked-up by the color image pickup means into complementary color components of said color components.

3. The color adjusting apparatus of claim 1, wherein said object is a two dimensional manuscript.

4. The color adjusting apparatus of claim 3, wherein said manuscript is a light reflection type of manuscript.

5. The color adjusting apparatus of claim 3, wherein said manuscript is a transparent manuscript.

6. The color adjusting apparatus of claim 1, wherein said light splitting means comprises:

a first half mirror, located in a light path of said optical system, which partially transmits and partially reflects said object light, said transmitted light being projected toward said screen and said reflected light being projected towards said color image pickup means; and a second half mirror, located behind said first half mirror with respect to the object, which transmits said object light transmitted through said first half mirror towards said screen and which reflects object light projected by said inverted image projecting means from outside of a light path of said first optical system towards the screen.

7. The color adjusting apparatus of claim 1, further comprising image signal recording means for recording the image signals adjusted by the color adjusting means.

8. The color adjusting apparatus of claim 1, wherein said screen is a transparent screen.

9. The color adjusting apparatus of claim 1, wherein said inverted image projecting means comprises of a CRT.

10. The color adjusting apparatus of claim 1, wherein said inverted image projecting means comprises a liquid crystal projector.

11. A color adjusting apparatus that includes color image pickup means for picking-up an object image signal of an object and color adjusting means for adjusting a color component of said object image signal picked-up by said color image pickup means, said color adjusting apparatus comprising:

an optical system for converging light that is one of reflected from or transmitted through the object, to form a direct image of the object;

light splitting means for splitting object light;

means for varying an image magnification of a bundle of rays of light split by said light splitting means;

a screen located at a point of convergence of said bundle of rays of light split by said light splitting means;

said color image pickup means being located at a point of convergence of another bundle of rays of light split by said light splitting means, and display means provided in a vicinity of said screen for displaying image signals so that a color tone of said image signals can be manually adjusted.

12. The color adjusting apparatus of claim 11, further comprising recording means for recording the image signals whose tone has been adjusted by the color adjusting means.

13. The color adjusting apparatus of claim 11, wherein a size of an image formed by said bundle of rays of light that converge on said screen is equal to a size of an image formed by said displaying image signals on said display means.

14. The color adjusting apparatus of claim 11, wherein said light splitting means is positioned along a first optical axis between said varying means and said optical system, said varying means being positioned along said first optical axis between said light splitting means and said screen, said color image pickup being positioned along a second optical axis that differs from said first optical axis.

15. The color adjusting apparatus of claim 11, wherein said image magnification varying means enlarges said bundle of rays of light split by said light splitting means that converge on said screen.

16. The color adjusting apparatus of claim 15, wherein said image magnification varying means enlarges said bundle of rays of light to form an image on said screen that is equal in size to an image formed by said displaying image signals on said display means.

17. A color adjusting apparatus that includes an color image pickup that picks up an object image signal of an object and a color adjuster that adjusts a color component of said object image signal picked-up by said color image pickup, said color adjusting apparatus comprising:

an optical system that forms a direct image of the object by converging light that is one of reflected from or transmitted through the object;

a light splitter that splits object light;

a screen located at a point of convergence of a bundle of rays of light split by said light splitter, said color image pickup being located at a point of convergence of another bundle of rays of light split by said light splitter; and a display provided in a vicinity of said screen for displaying image signals so that a color tone of said image signals can be manually adjusted, wherein said screen and said display are provided in a same plane.

18. The color adjusting apparatus of claim 17, wherein said screen is a transparent screen.

19. The color adjusting apparatus of claim 18, wherein a size of an image formed by said bundle of rays of light that converge on said screen is equal to a size of an image formed by said displaying image signals on said display.

20. The color adjusting apparatus of claim 17, wherein said light splitter is positioned along a first optical axis between said optical system and said screen, said color image pickup being positioned along a second optical axis that differs from said first optical axis.

21. A color adjusting apparatus, comprising:

an optical system having a projecting lens for converging light that is one of reflected from or transmitted through an object;

transparent indicating means located at a point of convergence of object light of an object projected by said optical system;

reflecting means, provided between said projecting lens and said transparent indicating means, for movement between a reading position in which said reflecting means is located in a light path of said optical system to reflect said object light in a direction away from said indicating means and a viewing position in which said reflecting means is retracted from said light path of said optical system to permit said object light to be projected onto said indicating means;

means for driving said reflecting means between said reading position and said viewing position;

color image pickup means located at a point of convergence of said object light reflected by said reflecting means;

tone adjusting means for adjusting a tone component of image signals picked-up by said color image pickup means; and signal processing means for enabling said indicating means to indicate image signals so that a color tone of said image signals can be manually adjusted.

22. The color adjusting apparatus of claim 21, further comprising back light means for illuminating said indicating means from behind, said back light means being movable between an operative position, in which said back light means is located behind said indicating means to illuminate said indicating means when said reflecting means is located in said reading position, and a retracted position, in which said back light means is retracted from behind said indicating means when said reflecting means is located in said viewing position.

23. The color adjusting apparatus of claim 22, further comprising:

means for driving said back light means between said operative position and said retracted position.

24. The color adjusting apparatus of claim 21, further comprising recording means for recording said image signals whose tone has been adjusted by said color adjusting means.

25. The color adjusting apparatus of claim 21, further comprising means for varying an image magnification of said object light of said object projected by said optical system to said transparent indicating means.

26. The color adjusting apparatus of claim 25, wherein said image magnification varying means varies a size of said object to be equal to a size of an object formed by said selectively adjustable color tone image signals.

27. The color adjusting apparatus of claim 25, wherein said reflecting means is selectively positioned along a first optical axis between said optical system and said transparent indicating means, said varying means being positioned along said first optical axis between said reflecting means and said transparent indicating means, said color image pickup means positioned along a second optical axis that differs from said first optical axis.

28. A color adjusting apparatus, comprising:

an optical system for converging light that is one of reflected from or transmitted through an object, to form a direct image of the object;

a transparent screen located at a point of convergence of object light representing said object projected by said optical system;

reflecting means, provided between said optical system and said transparent screen, for movement between a pickup position in which said reflecting means is located in a light path of said optical system to reflect said object light in a direction away from said screen and a retracted position in which said reflecting means is retracted from a light path of said optical system to permit said object light to be projected onto said screen;

color image pickup means located at a point of convergence of said object light reflected by said reflecting means at said pickup position;

tone adjusting means for adjusting a tone of image signals;

light intercepting means, provided between said reflecting means and said color image pickup means, for movement between an intercepting position in which said light intercepting means is located in a light path defined between said reflecting means and said color image pickup means to intercept said object light and an open position in which said light intercepting means is retracted from said light path defined between the reflecting means and the color image pickup means;

signal processing means for outputting image signals having a selectively adjustable color tone;

an image forming lens for converging said object light, reflected toward said screen by said reflecting means located at said pickup position, onto said screen; and driving means for moving said reflecting means and said light intercepting means in an associative manner.

29. The color adjusting apparatus of claim 28, wherein said driving means moves said light intercepting means to said retracted position and said intercepting position when said reflecting means is located in and retracted from said light path, respectively.

30. The color adjusting apparatus of claim 29, wherein said reflecting means comprises a sector shutter whose opposite surfaces are mirror surfaces.

31. The color adjusting apparatus of claim 30, wherein said light intercepting means comprises a sector shutter whose surface adjacent to said reflecting means is subject to an anti-reflection treatment or a light absorbing treatment.

32. The color adjusting apparatus of claim 31, wherein said sector shutters are driven by said driving means.

33. The color adjusting apparatus of claim 28, further comprising recording means for recording said image signals whose tone has been adjusted by said color adjusting means.

34. The color adjusting apparatus of claim 28, further comprising means for varying an image magnification of said object light of said object projected by said optical system to said transparent screen.

35. The color adjusting apparatus of claim 34, wherein said image magnification varying means varies a size of said object to be equal to a size of an object formed by said selectively adjustable color tone image signals.

* * * * *

UNITED STATES PATENT AND TRADEMARK OFFICE
CERTIFICATE OF CORRECTION

PATENT NO. : 5,488,492
DATED : January 30, 1996
INVENTOR(S) : T. ABE

It is certified that error appears in the above-indentified patent and that said Letters Patent is hereby corrected as shown below:

At column 12, line 55 (claim 9, line 2), change "comprises of" to ---comprises---.

Signed and Sealed this

Eighth Day of October, 1996

Attest:

BRUCE LEHMAN

Attesting Officer     Commissioner of Patents and Trademarks